US009254064B2

(12) United States Patent
Unteregger et al.

(10) Patent No.: US 9,254,064 B2
(45) Date of Patent: Feb. 9, 2016

(54) APPARATUS FOR PROCESSING A FOOD STUFF

(75) Inventors: Johan Unteregger, Klagenfurt (AT); Christian Rosenwirth, St. Georgen/Gailtal (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 25 days.

(21) Appl. No.: 14/239,668

(22) PCT Filed: Aug. 21, 2012

(86) PCT No.: PCT/IB2012/054221
§ 371 (c)(1),
(2), (4) Date: Feb. 19, 2014

(87) PCT Pub. No.: WO2013/030716
PCT Pub. Date: Mar. 7, 2013

(65) Prior Publication Data
US 2014/0203130 A1    Jul. 24, 2014

Related U.S. Application Data

(60) Provisional application No. 61/529,985, filed on Sep. 1, 2011.

(30) Foreign Application Priority Data

Sep. 1, 2011    (EP) .................................... 11179689

(51) Int. Cl.
*A47J 43/07* (2006.01)
*B26D 1/28* (2006.01)
*B26D 3/18* (2006.01)

(52) U.S. Cl.
CPC .............. *A47J 43/07* (2013.01); *A47J 43/0711* (2013.01); *B26D 1/28* (2013.01); *B26D 3/185* (2013.01)

(58) Field of Classification Search
CPC ...... A47J 43/07; A47J 43/0711; B26D 3/185; B26D 3/22; B26D 7/00; B26D 7/065; B26D 1/0006; B26D 1/29; B26D 7/2614; B26D 1/28
USPC .................. 241/69, 82.5, 282.1, 282.2, 292.1
See application file for complete search history.

(56) References Cited

U.S. PATENT DOCUMENTS

| 4,364,525 | A * | 12/1982 | McClean ......................... 241/92 |
| 6,149,083 | A * | 11/2000 | McFarland .................... 241/82.5 |
| 7,461,804 | B2 * | 12/2008 | Walters ....................... 241/292.1 |
| 7,628,345 | B2 * | 12/2009 | Schmid et al. .................. 241/30 |
| 2002/0084368 | A1 * | 7/2002 | Bernhardt et al. ........... 241/82.5 |
| 2004/0060414 | A1 * | 4/2004 | Sundqvist ........................ 83/663 |
| 2004/0173697 | A1 * | 9/2004 | Berger et al. ............. 241/46.013 |

FOREIGN PATENT DOCUMENTS

| DE | 7934681 U1 | 5/1980 | |
| DE | 20314247 U1 * | 9/2003 | ............. A47J 43/07 |
| DE | 102008040937 A1 * | 1/2010 | ............. A47J 43/07 |
| DE | 102008040937 A1 | 2/2010 | |
| EP | 0462299 B1 | 12/1991 | |
| GB | 1140669 A | 4/1966 | |
| WO | 2010012727 A1 | 2/2010 | |

* cited by examiner

*Primary Examiner* — Faye Francis
*Assistant Examiner* — Onekki Jolly

(57) ABSTRACT

The present application relates to an apparatus for processing a food stuff. The apparatus has a housing (2) and a cutting tool (5) for cutting a food stuff which is rotatably mounted in the housing. The cutting tool (5) rotates in the housing (2) about a rotational axis and has a radially extending cutting element (44). One end of the cutting tool (5) slides in a circumferentially extending slot in the housing as the cutting tool (5) is rotated in the housing (2). Therefore, the cutting tool (5) is supported in an axial direction by the housing (2). The present application also relates to a food processor.

15 Claims, 3 Drawing Sheets

APPARATUS FOR PROCESSING A FOOD STUFF

CROSS-REFERENCE TO PRIOR APPLICATIONS

This application is the U.S. National Phase application under 35 U.S.C. §371 of International Application No. PCT/IB2012/054221, filed on Aug. 21, 2012, which claims the benefit of U.S. Provisional Patent Application No. 61/529,985, filed Sep. 1, 2011 and European Patent Application No. 11179689.2, filed on Sep. 1, 2011. These applications are hereby incorporated by reference herein.

FIELD OF THE INVENTION

The present invention relates to an apparatus for processing a food stuff. The present invention also relates to a food processor comprising an apparatus for processing a food stuff.

BACKGROUND OF THE INVENTION

Apparatus are known for mechanically processing food stuffs. The mechanical processing of a food stuff includes the operation of slicing, chopping, cutting, dicing, mincing, shredding, crushing or grating. Such an apparatus generally forms part of a food processor for use as a domestic appliance and includes a container to which the apparatus is mounted to receive a processed food stuff, and a base unit on which the container and apparatus are removably disposed. A drive unit is disposed in the base unit to drive the apparatus.

One such apparatus for processing a food stuff is a dicing unit which cuts a food stuff into cubes. Such an apparatus is disclosed in DE 10 2008 040 937 and comprises a housing with a stationary cutting die having knives arranged in a grid fixedly mounted to the housing, and a diametrically extending cutting blade extending between diametrically opposing sides of an outer support ring which is rotatably mounted in the housing by clips. The stationary cutting die is disposed perpendicular to the rotational axis of the cutting tool so that the cutting blade moves twice per rotation over the stationary cutting die parallel to, but spaced from, the die as the cutting tool is rotated to slice a food stuff disposed between the rotating blade and the stationary die. A wedge element is mounted along the cutting blade which urges a food stuff cut by the cutting blade against and through the stationary cutting die so that the food stuff is diced.

However, disadvantages of this arrangement include a difficulty to manufacture and a complicated assembly procedure in which a plurality of clips are needed to be maneuvered into position to secure the cutting blade. Furthermore, it is necessary to support the cutting blade in a outer support ring to prevent the blade from deflecting and bending as it rotates due to the axial forces applied by the cut food stuff in the gap between the cutting die and the cutting blade Another configuration attempts to prevent the blade from bending and deflecting by mounting the cutting blade in a solid disc mounted to a rotational shaft. The disc is rotated by the shaft and deflection of the cutting blade is along its length is reduced. Furthermore, the shaft and disc are prevented from moving in an axial direction by thrust bearings acting on the shaft. However, such an arrangement is difficult to manufacture, requires expensive components, and a high torque is required to rotate the heavy disc.

SUMMARY OF THE INVENTION

Therefore, it is an object of the invention to provide an apparatus for processing food which substantially alleviates or overcomes the problems mentioned above.

According to the present invention, there is provided an apparatus for processing a food stuff comprising a housing, a cutting tool rotatably mounted in the housing to rotate about a rotational axis having a radially extending cutting element, and an arcuately extending slot in the housing, wherein one end of the cutting tool is configured to slide along the slot as the cutting tool is rotated in the housing so that the cutting tool is supported in an axial direction by the housing.

Advantages of the above arrangement include that the apparatus is easily manufactured, the cutting tool is simply supported in the housing and a low torque is required to drive the cutting tool.

The elongate cutting tool may have a support element at one end which is configured to slide along the slot as the cutting tool is rotated in the housing.

The one end may be a first end of the elongate cutting tool and the elongate cutting tool may further comprise a support collar at the other end of the elongate cutting tool to the support element which may be configured to slide between opposing surfaces of the housing so that the cutting tool is supported in an axial direction by the housing at both the first and second ends.

Advantageously, the apparatus further comprises a processing region in the housing in which a food stuff is receivable and the cutting tool is configured to pass once per revolution through the processing region, wherein the cutting tool is configured to slide along the slot as it passes through at least part of the processing region.

With this arrangement, the cutting tool is supported in the region in which an axial force is applied due to the cutting tool acting on a food stuff received in the processing region.

Conveniently, the cutting tool has a cutting edge and an trailing edge, the cutting tool being configured to pass through a recovery region in which the cutting tool is free to rotate without contacting the food stuff in the processing region, wherein the recovery region is defined in the housing between the trailing edge passing from the processing region and the cutting edge passing into the processing region as the cutting tool rotates, so that the cutting tool acts on a food stuff as the cutting tool rotates through the processing region, and recovers the rotational speed lost due to acting on a food stuff in the processing region as the cutting tool rotates through the recovery region in which the cutting tool is free to rotate without contacting the food stuff in the processing region.

The arcuately extending slot extends circumferentially around the housing.

Therefore, the cutting tool is supported in an axial direction about its entire rotational path in the housing.

In one embodiment, the cutting tool further comprises a support element disposed at said one end of the cutting tool, the support element being slidably received in the circumferentially extending slot.

Therefore, the said one end of the cutting tool correctly locates in and is stably supported in the slot.

The support element may be an arcuate member.

One advantage of the above arrangement is that the cutting element is stably guided in the slot and prevented from twisting about its length.

Conveniently, the cutting tool further comprises a mounting element at one end of the cutting tool about which the cutting tool is configured to rotate.

Therefore, the cutting tool is easily mounted and rotatably received in the housing.

Advantageously, the housing comprises opposing support surfaces and the mounting element is configured to be supported by the opposing support surfaces.

The above arrangement ensures that the cutting tool is supported at each end of its radial length.

In one embodiment, the opposing support surfaces extend around the bore in the housing and the mounting element comprises a circumferentially extending support collar configured to locate between the opposing support surfaces.

Therefore, the cutting tool is simply supported in an axial direction proximate to the rotational axis of the cutting tool.

The cutting element may extend between the support element and the mounting element.

An advantage of the above arrangement is that the cutting element is supported in an axial direction at each end of its length, and the cutting tool is easily manufactured.

The apparatus may further comprise a cutting die for cutting a food stuff fixedly mounted in the housing.

In one embodiment, the slot is formed by an insert which is fixedly mounted to the cutting die.

Therefore, an axial force applied on the insert by the cutting tool is directly transmitted to the cutting die.

The slot may be integrally formed with the cutting die.

Advantageously, the radially extending cutting element of the cutting tool passes across the cutting die spaced from, but parallel to, the cutting die when the cutting tool is rotated.

The cutting tool may further comprise a wedge element configured to urge a food stuff cut by the cutting tool in an axial direction.

Therefore, a simple arrangement for urging a food stuff cut by the cutting tool in an axial direction is formed.

In one embodiment, the housing comprises an upper part and a lower part which are releasably mounted to each other.

The above arrangement provides a simple means of removing the cutting tool from the housing, and allows the apparatus to be easily cleaned.

Conveniently, the circumferentially extending slot comprises a circumferentially extending surface on the upper part and a circumferentially extending surface on the lower part which are configured to be spaced from each other when the upper and lower parts are mounted to each other.

According to another aspect of the invention, there is provided a food processor comprising an apparatus for processing a food stuff.

The food processor advantageously further comprises a drive unit, wherein the drive unit is a hand-blender.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
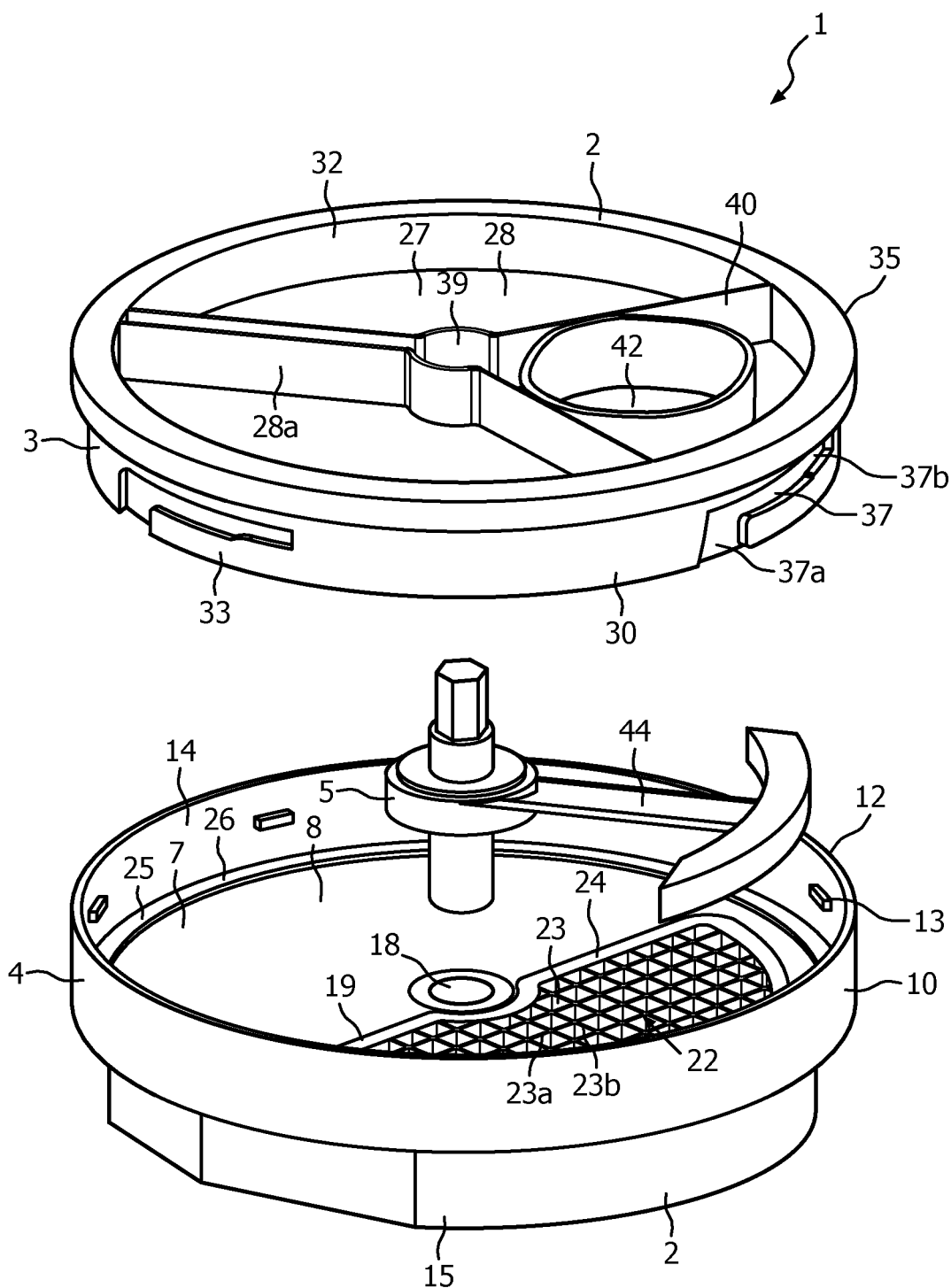
FIG. 1 shows an exploded perspective view of an apparatus for processing food.
Figure 2:
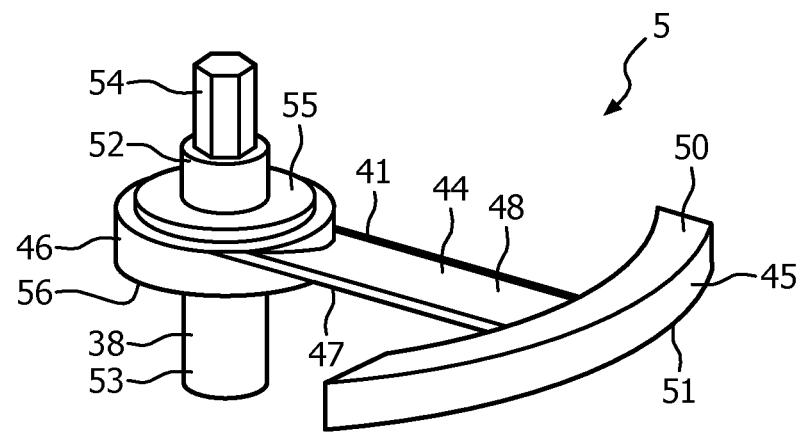
FIG. 2 shows a perspective view of a cutting tool of the apparatus for processing food shown in FIG. 1.

Referring to FIGS. 1 and 2, an apparatus for processing food 1 is shown. The present embodiment is arranged to dice a food stuff into cubes, however it will be appreciated that the apparatus may be configured to apply an alternative process to a food stuff, for example slicing, chopping, cutting, dicing, mincing, shredding, crushing or grating. The apparatus comprises a housing 2 having an upper part 3 and a lower part 4 and one cutting tool 5 which is rotatably mounted in the housing 2 between the upper and lower parts 3, 4.

The apparatus 1 forms part of a food processor for use as a home appliance comprising a container (not shown) for storing a food stuff that has been mechanically processed by the food processing unit and a drive unit to rotatably drive the cutting tool 5. The apparatus 1 is releasably mounted to an upper end of the container so that processed food falls into the container and the drive unit is releasably engaged with the apparatus 1 to mechanically engage with the cutting tool to rotate the cutting tool in the housing. In the present embodiment the drive unit is a hand-held blender which is releasably mounted to drive the cutting tool 5.

The housing 2 is generally cylindrical and comprises the upper part 3 and the lower part 4 which are releasably mountable to each other by a locking mechanism. The lower part 4 has an upper face 8 and a lower face 9 formed by a circular base 7. A circumferentially extending upper wall 10 upstands from the upper face 8 and extends around the periphery of the base 7. The upper wall 10 has a circumferential rim 12 at its upper end, and tabs 13 protrude from an inner face 14 of the upper wall 10 which are spaced around the inner face 14. The tabs 13 act as attachment members to attach the lower part 4 to the upper part 3.

A circumferentially extending lower wall 15 extends downwardly from the lower face 9. The lower wall 15 is inset slightly from the upper wall 10. A tubular section 16 extends downwardly from the lower face 9 and forms a lower bore 17 with a lower bore opening 18 in the upper face 8. The longitudinal axis of the bore 17 is formed to extend coaxially with the longitudinal axis of the lower part 4, in particular the upper wall 10.

A die receiving aperture 19 is formed in the base 7 of the lower part 4 extending between the upper and lower faces 8, 9. The aperture 19 has an inwardly facing support flange 20 extending around its periphery which is spaced from the upper face 8 to support a cutting die unit 22 which is removably received in the aperture 19.

The cutting die unit 22 comprises a grid of upstanding cutting blades 23 supported by a frame 24, with a first array of cutting blades 23a arranged to intersect a second array of cutting blades 23b at 90 degrees. Although the first and second array of cutting blades 23a, 23b are arranged perpendicular to each other, it will be appreciated that they may be arranged at an alternative angle to each other. The cutting die unit 22 is received in the die receiving aperture 19 from the base upper face 8 and supported by the support flange 20. The cutting die unit 22 forms a stationary cutting unit, as will become apparent hereinafter. In an alternative arrangement the cutting die unit 22 is integrally formed with the base 7 of the lower part 4.

A step 25 extends circumferentially around the lower edge of the inner face 14 of the upper wall 10 to form a circumferentially extending locating face 26 which is raised from and extends around the periphery of the upper face 8.

The upper part 3 of the housing 2 has an upper surface 28 and a lower surface 29 formed by a circular panel 27. A circumferentially extending outer wall 30 extends around the periphery of the wall 27 and has an upper portion 32 upstanding from the upper surface 28 and a lower portion 33 downwardly extending from the lower surface 29. The outer wall lower portion 33 has a lower edge 34 and the outer wall upper portion 32 has an outwardly extending shoulder 35 extending circumferentially around its upper edge.

The diameter of an outer surface 36 of the outer wall 30 corresponds to the diameter of the inner face 14 of the lower part upper wall 10 so that the upper part 3 is slidably receivable in the lower part 2. Recesses 37 are formed in the outer surface 36 of the outer wall 30. Each recess 37, acting as an attachment element, comprises an inlet section 37a which is open at the lower edge 34, and an attachment section 37b which extends arcuately around the outer surface 36 of the outer wall 30. The location of each recess 37 corresponds to the location of each of the tabs 13 on the lower part 4 so that the slots and tabs align with each other, and the tabs engage in the recess to mount the upper and lower parts 3, 4 together when the container 2 and lid 3 are drawn together.

The upper part 3 has an upper bore 39 with an upper bore opening 40 in the lower surface 29 for receiving a central shaft, acting as a mounting element 38, of the cutting tool 5. The longitudinal axis of the upper bore 39 extends coaxially with the longitudinal axis of the upper part 3 so that, when the upper and lower parts 3, 4 of the housing 2 are mounted to each other, the longitudinal axis of the upper bore 39 in the upper part 3 extends co-axially with the longitudinal axis of the lower bore 17 in the lower part 4.

Support ribs 28a extend from the upper surface 28 of the upper part 3 between the outer wall 30 and the upper bore 39 to provide structural support to the upper part 3. An opening defining a food stuff inlet 42 is formed through the upper part 3 so that a food stuff is able to be fed through the inlet 42 to a cutting tool receiving space 43 defined between the upper and lower parts 3, 4 when the housing 2 is assembled. When the housing 2 is assembled the food stuff inlet 42 is aligned with and disposed above the cutting die unit 22, so that a food stuff fed into the housing 2 is urged towards the cutting die unit 22.

Figure 3:
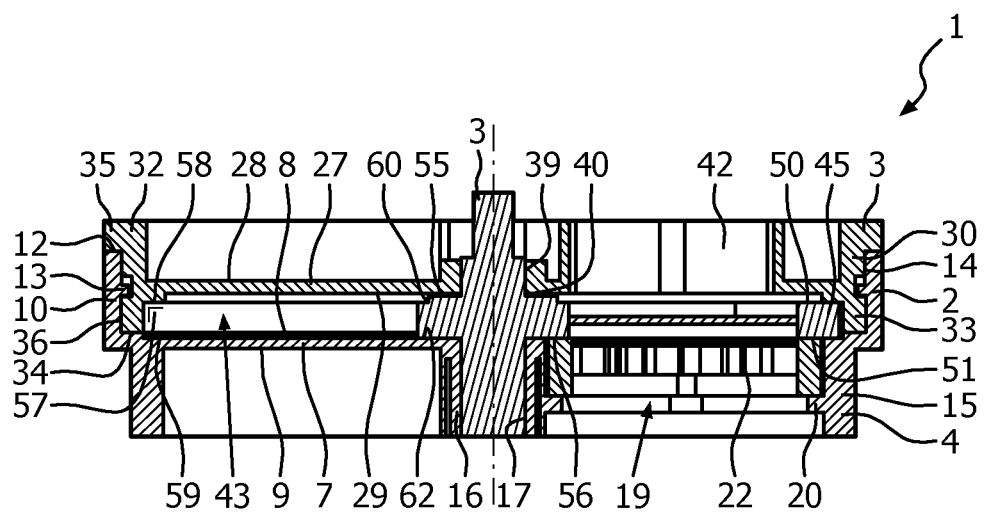
FIG. 3 shows a cross-sectional view of the apparatus for processing food shown in FIG. 1.

The cutting tool 5 is shown in FIG. 3. The central shaft, acting as a mounting element 38, of the cutting tool 5 defines a rotational axis of the cutting tool 5 and an elongate cutting element 44 extends radially from the mounting element 38. A support element 45 is disposed at a distal end of the cutting element 44 to the mounting element 38. The mounting element 38 has a support collar 46 extending circumferentially around its axis.

Figure 4:
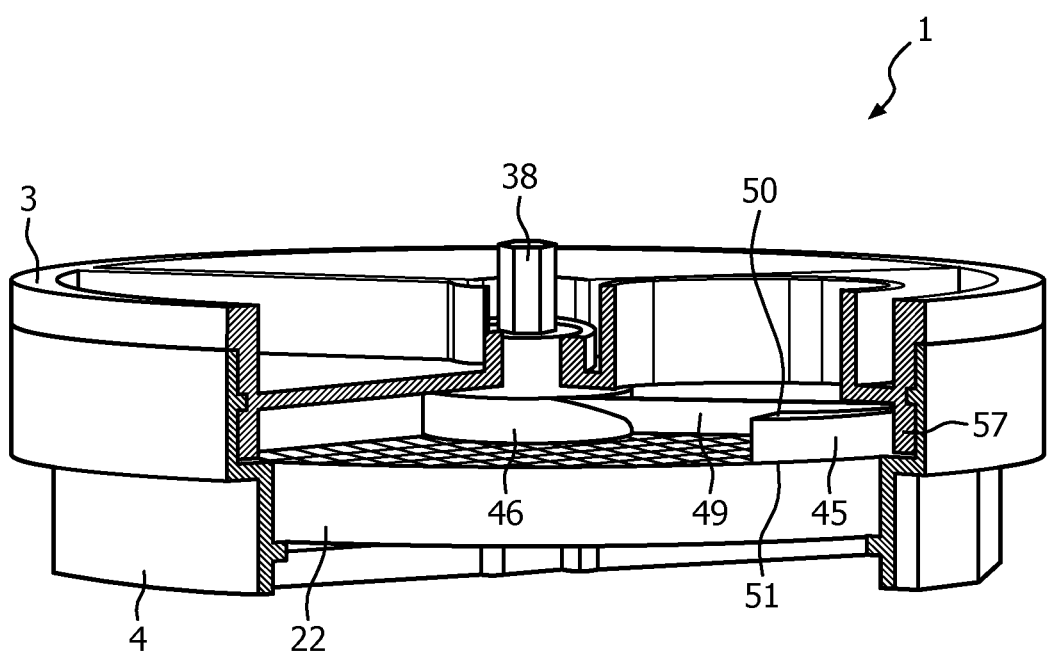
FIG. 4 shows a partial cross-sectional perspective view of the apparatus for processing food shown in FIG. 1.

The cutting element 44 is an elongate blade with a leading edge which forms a cutting edge 47 of the cutting tool 5. A wedge element 48 extends from the cutting element 44, away from the cutting edge 47, and has an urging face 49 (refer to FIG. 4) which angles downwardly from the cutting edge 47 to apply an component of force in an axial direction to a food stuff cut by the cutting element 44 as the cutting element 44 is rotated about its rotational axis. The cutting edge 47 forms the leading edge as the cutting tool is rotated and an opposing edge of the cutting tool 5 to the cutting edge 47 forms a trailing edge 41.

In the present embodiment the wedge element 48 is integrally formed with the cutting element 44, however it will be appreciated that the configuration of the cutting tool 5 is not limited thereto and that the wedge element 48 may be a separate component.

The support element 45 is an elongate arcuate member mounted to the distal end of the cutting element 44. The support element 45 extends transversely to the rotational axis of the cutting tool 5 and arcs around the rotational axis. The support element 45 has an upper support face 50 and a lower support face 51.

The support collar 46 is formed midway along the mounting element 38 and defines an upper shaft portion 52 and a lower shaft portion 53 extending from each side of the support collar 46. A drive unit engaging means 54 is formed on the upper shaft portion 52 to directly or indirectly engage with a drive unit (not shown) to rotate the cutting tool 5. The support collar 46 is cylindrical and has a top support face 55 and a bottom support face 56.

When the housing 2 is assembled, the upper and lower parts 3, 4 of the housing are brought together and are mounted to each other by engaging the tabs 13 in the recesses 37 and rotating the upper and lower parts 3, 4 relative to each other so that the tabs locate in the attachment section 37b of the recesses 37. A circumferentially extending slot 57 is formed between the upper face 8 of the lower part base 7 and the lower surface 29 of the upper part 4.

The slot 57 extends around the periphery of the cutting tool receiving space 43 and is arranged to slidably receive the support element 45 of the cutting tool 5, as will become apparent hereinafter. The slot 57 has an upper slot surface 58 and a lower slot surface 59 which oppose each other and are formed by the lower surface 29 of the housing upper part 3 and the upper face 8 of the housing lower part 4 respectively. The upper slot surface 58 and the lower slot surface 59, form plain bearing surfaces along which the support element 45 of the cutting tool 5 is able to slide.

Similarly, an upper collar guide surface 60 is defined around the upper bore opening 40 and formed by the lower surface 29 of the housing upper part 3, and a lower collar guide surface 62 is defined around the lower bore opening 18 and formed by the upper face 8 of the housing lower part 4 respectively. The upper collar guide surface 60 and the lower collar guide surface 62, form plain bearing surfaces along which the support collar 46 of the cutting tool 5 is able to slide.

The spacing between the upper slot surface 58 and the lower slot surface 59 corresponds to the height of the support element 45 between its upper support face 50 and lower support face 51, so that the support element 45 is prevented from moving in the slot 57 in an axial direction, but is able to slide circumferentially around the slot 57.

The spacing between the upper collar guide surface 60 and the lower collar guide surface 62 corresponds to the height of the support collar 46 between its top support face 55 and bottom support face 56, so that the support collar 46 is prevented from moving in an axial direction, but is able to slide about the guide surfaces 60, 62.

Although in the present embodiment the bearing surfaces formed by the slot and around the bore openings are formed integrally with the remainder of the upper surface of the lower part base and the lower surface of the upper part, it will be appreciated that the surfaces may be distinct and may upstand from the other surfaces, or may have a different surface finish to allow the support element and support collar to slide thereon more easily.

A processing region is defined in the cutting tool receiving space 43 as a space in the cutting tool receiving space 43 in which an unprocessed food stuff fed into the housing 2 is received. The processing region is defined by the projected volume in an axial direction below the inlet 42 in the upper part 3, and extending to the cutting die unit 22. The extent of the processing region is substantially determined by the periphery of the inlet 42, however it will be appreciated that food stuff may disperse slightly outside the periphery of the inlet 42.

It will be appreciated that the area of the projected volume of the processing region in an axial direction is encompassed by the area of the cutting die unit 22, so that a food stuff in the processing region is urged against and through the cutting die unit 22 by the rotating cutting tool 5. Furthermore, it will be appreciated that the area of the processing region in an axial direction is smaller than the area of the cutting die unit 22.

A recovery region is also defined in the cutting tool receiving space 43. The recovery region is defined as the section of the path of the cutting tool 5 as it is rotated in the cutting tool receiving space 43, between the trailing edge 41 of the cutting tool 5 passing from the processing region and the cutting edge 47 of the cutting tool 5 passing into the processing region. As the trailing edge 41 of the cutting tool 5 passes from the processing region, it is no longer in contact with an unprocessed food stuff fed into the processing region, and so the cutting tool 5 is not restricted from moving due to the action of the unprocessed foodstuff and is free to rotate in the cutting tool receiving space 43. As the cutting edge 47 of the cutting tool 5 passes into the processing region, it contacts an unprocessed food stuff fed into the processing region which resists rotation of the cutting tool 5.

Although in the present embodiment the slot extends circumferentially around the periphery of the cutting tool receiving space 43, it will be appreciated that in an alternative embodiment the slot extends arcuately around a section of the periphery of the cutting tool receiving space 43 only. In one embodiment, the slot extends along a section of the periphery of the cutting tool receiving space which encompasses the processing region. Therefore, the cutting tool in supported along the section of its path in which an axial force is applied to the cutting tool 5 by an unprocessed foodstuff received in the processing region. In the above described embodiments, the slot is formed to be circular, or part of an arc of a circle. However, it will be appreciated that the slot may be formed from a number of adjacent planar sections which form a polygonally-shaped slot which extends arcuately around the, or a section of the, periphery of the cutting tool receiving space 43.

Operation of the apparatus will now be described with reference to the drawings. The cutting tool 5 is inserted into the cutting tool receiving space 43 and the lower portion 53 of the mounting element 38 is received through the lower bore opening 18 in the lower part 4. The bottom support face 56 of the support collar 46 lies along the lower collar guide surface 62 and the lower support face 51 of the support element 45 lies along against the lower slot surface 59 at a periphery of the lower part upper face 8. The lower portion 53 of the mounting element 38 is supported by the lower bore 17 but is free to rotate therein so that the cutting tool 5 is able to freely rotate about the lower part 4 of the housing 2. The upper part 3 of the housing 2 is then brought towards the lower part 4 and is mounted thereto by the tabs 13 being engaged in the recesses 37 as part of the upper part 3 overlaps the lower part 4 and is rotated relative thereto about the rotational axis.

As the upper part 3 is brought together with the lower part 4, the upper portion 52 of the cutting tool mounting element 38 is received through the upper bore opening 40 in the upper part 3. The slot 57 is defined by the upper slot surface 58 on the upper part 3 being positioned opposite to the lower slot surface 59 on the lower part 4. When the upper and lower parts 3, 4 are mounted to each other, the upper and lower slot surfaces 58, 59 are spaced from, but extend parallel to, each other by a predetermined distance.

When the housing is assembled, the upper support face 50 of the support element 45 lies along the upper slot surface 58 and the lower support face 51 of the support element 45 lies along the lower slot surface 59 at a periphery of the lower part upper face 8. The upper portion 52 of the mounting element 38 is supported by the upper bore 39 but is free to rotate therein so that the cutting tool 5 is able to freely rotate about the upper part 3 of the housing 2, and therefore in the cutting tool receiving space 43. The cutting element 44 extends radially outwardly from the rotational axis of the cutting tool 5.

A drive unit (not shown) is then engaged with the drive unit engaging means 54 and is operated to rotate the mounting element 38 and therefore the cutting tool 5 in the housing 2. The support collar 46 is free to slide between the upper collar guide surface 60 and the lower collar guide surface 62 so that it rotates about the rotational axis, but is prevented from moving in an axial direction by the top support face 55 and bottom support face 56 of the support collar 46 abutting the upper collar guide surface 60 and the lower collar guide surface 62 respectively.

Similarly, the support element 45 is free to slide in the circumferentially extending slot 57 between the upper slot surface 58 and the lower slot surface 59 so that it rotates in the housing about the rotational axis of the cutting tool 5. However the support element 45 is prevented from moving in an axial direction by the upper support face 50 and lower support face 51 of the support element 45 abutting the upper slot surface 58 and the lower slot surface 59 respectively.

Therefore, it will be appreciated that the cutting element 44 is prevented from moving in an axial direction because it is supported in the housing by the support element 45 at one end and the support collar 46 at the other end.

An unprocessed food stuff is then fed into the cutting tool receiving space 43 through the food stuff inlet 42 formed through the upper part 3 and is received in the processing region. The food stuff inlet 42 is disposed above the cutting die unit 22 and so the food stuff abuts the cutting die unit 22. The cutting tool 5 is rotated in the housing 2 so that the cutting element 44 rotates into contact with the food stuff and the cutting edge 47 of the cutting element 44 then cuts the food stuff as it rotates to divide the part of the food stuff between the path of the cutting element 44 and the cutting die unit 22 from the remainder of the food stuff. As the cutting tool continues to rotate the urging face 49 of the wedge element 48 acts on the cut food stuff and urges it against and through the cutting die unit 22 to complete the cubing operation of the apparatus.

As the cutting edge 47 of the cutting tool 5 passes into the processing region, the cutting tool 5 contacts the unprocessed food stuff received in the processing region. A resistive force acts on the cutting tool 5 due to the action of the cutting element cutting the food stuff as it rotates through the processing region, and the wedge element 48 acts on the cut food stuff to urge it against and through the cutting die unit 22 to complete the cubing operation of the apparatus. Therefore, the path of the cutting tool 5 is restricted by the food stuff as it passes through the processing region and the rotational speed of the cutting tool 5 reduces due to the load on the cutting tool as the hand blender acting as a drive unit has a limited torque.

As the cutting tool 5 is rotated and acts on the food stuff, an axial force is applied to the cutting element 44 by the food stuff and so the cutting element 44 is urged to move and deform upwardly due to the forces imparted on the cutting element 44 and the wedge element 48. However, the support element 45 and support collar 46 stably hold the cutting element 44 and so prevent the cutting tool 5 from deforming or moving in an axial direction.

When the trailing edge 41 of the cutting tool 5 passes from the processing region as the cutting tool 5 rotates, the cutting tool passes into the recovery region. Therefore, the resistive force of the unprocessed food stuff received in the processing region acting on the cutting tool 5 is removed. The cutting tool 5 is then free to rotate in the recovery region in the cutting tool receiving space until the cutting edge 47 passes back into the processing region. As the trailing edge 41 of the cutting tool 5 passes from the processing region the resistive force of the unprocessed food stuff in the processing region is removed and so the load acting on the cutting tool 5 and drive unit reduces. Therefore, the rotational speed of the cutting tool 5 is able to recover in the recovery region defined by the path of the cutting tool 5 outside the processing region.

Therefore, a smooth operation of the apparatus is ensured, and the apparatus performs a uniform processing of the food stuff. In addition, the noise levels produced by the apparatus are minimised.

Although in the above embodiments the slot for supporting the cutting tool is formed by the upper and lower parts of the housing defining the slot, it will be appreciated that other arrangements are envisaged. For example, in one alternative embodiment the slot is formed by an insert which is fixedly mounted in the housing when the upper and lower parts are attached to each other. Alternatively, the slot is formed by an insert which is fixedly mounted to, or integrally formed with the cutting die. In such an arrangement the insert has a lower face and an upper face to form a slot in which the cutting slot slides. Therefore, an axial force applied by the cutting tool on the insert forming the slot is transmitted to the cutting die and the spacing between the cutting die and the cutting tool is maintained.

Although in the above exemplary embodiments a handheld blender is used as the drive unit, it will be appreciated that an alternative drive unit may be used to drive the apparatus for processing a food stuff.

In the present embodiment the housing 2, support collar 46 and support element 45 are formed from a molded plastic, however it will be appreciated that they may be formed from any suitable material.

Although in the above exemplary embodiment the apparatus for cutting a food stuff is configured to dice a food stuff into cubes, it will be appreciated that the invention is not limited thereto and that the apparatus may be configured to process a food stuff in an alternative manner, for example by an operation of slicing, chopping, cutting, dicing, crushing or grating.

Although in the above exemplary embodiments the mounting element 38 is a shaft which is received in an upper bore 39 of the upper part 3 and the lower bore 17 of the lower part 4, in an alternative embodiment a shaft is rotatably mounted to the lower part 3 of the housing 2 and a mounting element of the cutting tool has a bore which slides over and engages with the shaft. Therefore, when the shaft is rotated the cutting tool is rotated with the shaft through torque transferred through the mounting element.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. An apparatus for processing a food stuff comprising
a housing comprising an upper part and a lower base part,
an elongate cutting tool rotatably mounted in a circumferentially extending slot in the housing to rotate about a rotational axis having only a single radially extending cutting element,
wherein the slot is formed by an upper face of the lower base part and an lower surface of the upper part thereby forming an upper slot surface and a lower slot surface which oppose each other,
wherein the slot is arranged to slidably receive a support element coupled to a distal end of the elongate cutting tool and configured to slide along the slot as the elongate cutting is rotated in the housing so that the elongate cutting tool is supported in an axial direction in the housing.

2. An apparatus according to claim 1, wherein the elongate cutting tool has a support element at one end which is configured to slide along the slot as the cutting tool is rotated in the housing.

3. An apparatus according to claim 2, wherein the one end is a first end of the elongate cutting tool and the elongate cutting tool further comprises a support collar at the other end of the elongate cutting tool to the support element which is configured to slide between opposing surfaces of the housing so that the cutting tool is supported in an axial direction by the housing at both the first and second ends.

4. An apparatus according to claim 1, further comprising a processing region in the housing in which a food stuff is receivable and the elongate cutting tool is configured to pass once per revolution through the processing region, wherein the cutting tool is configured to slide along the slot as it passes through at least part of the processing region.

5. An apparatus according to claim 4, wherein the cutting tool has a cutting edge and an trailing edge, the cutting tool being configured to pass through a recovery region in which the cutting tool is free to rotate without contacting the food stuff in the processing region, wherein the recovery region is defined in the housing between the trailing edge passing from the processing region and the cutting edge passing into the processing region as the cutting tool rotates, so that the cutting tool acts on a food stuff as the cutting tool rotates through the processing region, and recovers the rotational speed lost due to acting on a food stuff in the processing region as the cutting tool rotates through the recovery region in which the cutting tool is free to rotate without contacting the food stuff in the processing region.

6. An apparatus according to claim 1, wherein the arcuately extending slot extends circumferentially around the housing.

7. An apparatus according to claim 2, wherein the cutting tool further comprises a mounting element at one end of the cutting tool about which the cutting tool is configured to rotate.

8. An apparatus according to claim 7, wherein the housing comprises opposing support surfaces and the mounting element is configured to be supported by the opposing support surfaces.

9. An apparatus according to claim 8, wherein the opposing support surfaces extend around the bore in the housing and the mounting element comprises a circumferentially extending support collar configured to locate between the opposing support surfaces.

10. An apparatus according to claim 7, wherein the cutting element extends between the support element and the mounting element.

11. An apparatus according to claim 1, further comprising a cutting die for cutting a food stuff mounted in the housing.

12. An apparatus according to claim 11, wherein the slot is formed by an insert which is fixedly mounted to a cutting die unit.

13. An apparatus according to claim 12, wherein the slot is integrally formed with a cutting die unit.

14. An apparatus according to claim 1, wherein the housing comprises an upper part and a lower part which are releasably mounted to each other.

15. A food processor comprising an apparatus for processing a food stuff, wherein the apparatus comprises:
- a housing comprising an upper part and a lower base part,
- an elongate cutting tool rotatably mounted in a circumferentially extending slot in the housing to rotate about a rotational axis having only a single radially extending cutting element,
- wherein the slot is formed by an upper face of the lower base part and an lower surface of the upper part thereby forming an upper slot surface and a lower slot surface which oppose each other,
- wherein the slot is arranged to slidably receive a support element coupled to a distal end of the elongate cutting tool and configured to slide along the slot as the elongate cutting is rotated in the housing so that the elongate cutting tool is supported in an axial direction in the housing.

* * * * *